US008285915B2

(12) United States Patent
Jacobs et al.

(10) Patent No.: US 8,285,915 B2
(45) Date of Patent: Oct. 9, 2012

(54) RELOCATING PAGE TABLES AND DATA AMONGST MEMORY MODULES IN A VIRTUALIZED ENVIRONMENT

(75) Inventors: Stuart Z. Jacobs, Lakeville, MN (US); David A. Larson, Rochester, MN (US); Wade B. Ouren, Rochester, MN (US); Edward C. Prosser, Rochester, MN (US); Kenneth C. Vossen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 12/686,681

(22) Filed: Jan. 13, 2010

(65) Prior Publication Data

US 2011/0173370 A1 Jul. 14, 2011

(51) Int. Cl.
*G06F 12/02* (2006.01)

(52) U.S. Cl. ............................. 711/6; 711/206; 718/105

(58) Field of Classification Search ....................... 711/6
See application file for complete search history.

(56) References Cited

U.S. PATENT DOCUMENTS 7,925,850 B1 * 4/2011 Waldspurger et al. ........ 711/162
2008/0256327 A1 * 10/2008 Jacobs et al. .................. 711/207
2009/0282300 A1 * 11/2009 Heyrman et al. ............. 714/708
2009/0307447 A1 * 12/2009 Jacobs et al. .................. 711/162
2010/0299666 A1 * 11/2010 Agbaria et al. ................... 718/1
2011/0099319 A1 * 4/2011 Mukherjee et al. ............... 711/6

OTHER PUBLICATIONS

"High Performance Virtual Machine Migration with RDMA over Modern Interconnects" by Huang et al. , published by IEEE international conference on cluster computing, 1-4244-1388-5/07, 2007, pp. 11-20.*

* cited by examiner

*Primary Examiner* — Kaushikkumar Patel
(74) *Attorney, Agent, or Firm* — Biggers & Ohanian, LLP

(57) ABSTRACT

Relocating data in a virtualized environment maintained by a hypervisor administering access to memory with a Cache Page Table ('CPT') and a Physical Page Table ('PPT'), the CPT and PPT including virtual to physical mappings. Relocating data includes converting the virtual to physical mappings of the CPT to virtual to logical mappings; establishing a Logical Memory Block ('LMB') relocation tracker that includes logical addresses of an LMB, source physical addresses of the LMB, target physical addresses of the LMB, a translation block indicator for each relocation granule, and a pin count associated with each relocation granule; establishing a PPT entry tracker including PPT entries corresponding to the LMB to be relocated; relocating the LMB in a number of relocation granules including blocking translations to the relocation granules during relocation; and removing the logical addresses from the LMB relocation tracker.

24 Claims, 9 Drawing Sheets

RELOCATING PAGE TABLES AND DATA AMONGST MEMORY MODULES IN A VIRTUALIZED ENVIRONMENT

FIELD OF THE INVENTION

The field of the invention is data processing, or, more specifically, methods, apparatus, and products for relocating page tables and data amongst memory modules in a virtualized environment.

DESCRIPTION OF RELATED ART

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Today's complex computer systems are required by their users to be continuously available. Increasingly, customers are requiring that any piece of hardware be able to be repaired or replaced while the computer system is running, including memory, processors, and I/O hardware. Repair or replacement of a hardware component in a running system may require the customer, using platform management interfaces, to deconfigure the identified failing hardware component, or a group of hardware components which includes the identified failing component. A grouping of hardware components usually consists of the smallest grouping of hardware that can be electrically isolated and mechanically removed from the system for replacement without impacting the rest of the running system.

In order to remove a grouping of hardware that contains memory—a memory module—from a running computer system, without interruption of operation of the computer system, the contents of the memory in that node must first be relocated to free memory on other nodes. This poses a challenge for memory used for partition hardware page tables (HPTs) in virtualized environments, which may be accessed by the partition via operating system hcalls to the hypervisor and accessed separately by the hardware.

One solution is to suspend the partition that utilizes the HPT. While the partition is suspended, the HPT could be copied to its new location. This solution, however, impacts the partitions performance. Copying data of that size while the partition is suspended would cause communication line timeouts and noticeable delays by users of the partitions. Further, in addition to the page table, operational data stored in the memory module to be replaced may also need relocated. Suspending the partition during relocation of such data is in the same way undesirable. That is, current methods of relocating page tables and data utilized in a virtualized environment are inefficient, time-consuming, and costly.

SUMMARY OF THE INVENTION

Methods, apparatus, and products for relocating page tables amongst memory modules in a virtualized environment are disclosed. The page tables include a Cache Page Table ('CPT') and a Physical Page Table ('PPT'). The CPT includes virtual to logical address mappings and is accessible by an operating system executing in a partition of the virtualized environment maintained by a hypervisor. The PPT includes virtual to physical address mappings and is accessible by a computer processor. Relocating the page tables includes relocating the CPT in portions from a source memory location to a target memory location, each portion of the CPT including one or more CPT entries. Relocating the CPT in portions includes: initializing an index value representing a next CPT entry to be relocated, and for each portion: suspending the partition, relocating the portion to the target memory location, setting the index value to represent the next CPT entry of the portion to be relocated, and resuming operation of the partition. Relocating the page tables also includes relocating all valid entries of the PPT to a target PPT memory location. Relocating all valid entries of the PPT to the target PPT memory location includes initializing the target PPT memory location with invalid entries; changing a page table pointer of the computer processor from the PPT to the target PPT memory location; and individually, for each valid entry of the PPT: setting a lock blocking access to the entry, relocating the entry to the target PPT memory location, invalidating the entry in the PPT, and releasing the lock.

Methods, apparatus, and products for relocating data amongst memory modules in a virtualized environment maintained by a hypervisor are disclosed. The hypervisor administers access to memory by a partition with a Cache Page Table ('CPT') and a Physical Page Table ('PPT'). The CPT includes virtual to physical address mappings and is accessible by an operating system executing in a partition of the virtualized environment. The PPT includes virtual to physical address mappings and is accessible by a computer processor. Relocating the data includes converting the virtual to physical address mappings of the CPT to virtual to logical address mappings; establishing a Logical Memory Block ('LMB') relocation tracker, the LMB relocation tracker including logical addresses of an LMB to be relocated, source physical addresses of the LMB to be relocated, target physical addresses of the LMB to be relocated, a translation block indicator for each relocation granule of the LMB, and a pin count associated with each relocation granule, the pin count representing a number of outstanding translations to the associated relocation granule; establishing a PPT entry tracker including PPT entries corresponding to the LMB to be relocated; relocating the LMB in a number of relocation granules in dependence upon the PPT entry tracker and the LMB relocation tracker including blocking translations to the relocation granules during relocation; and, upon relocation of all granules in the LMB, removing, from the LMB relocation tracker, the logical addresses of the LMB to be relocated.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
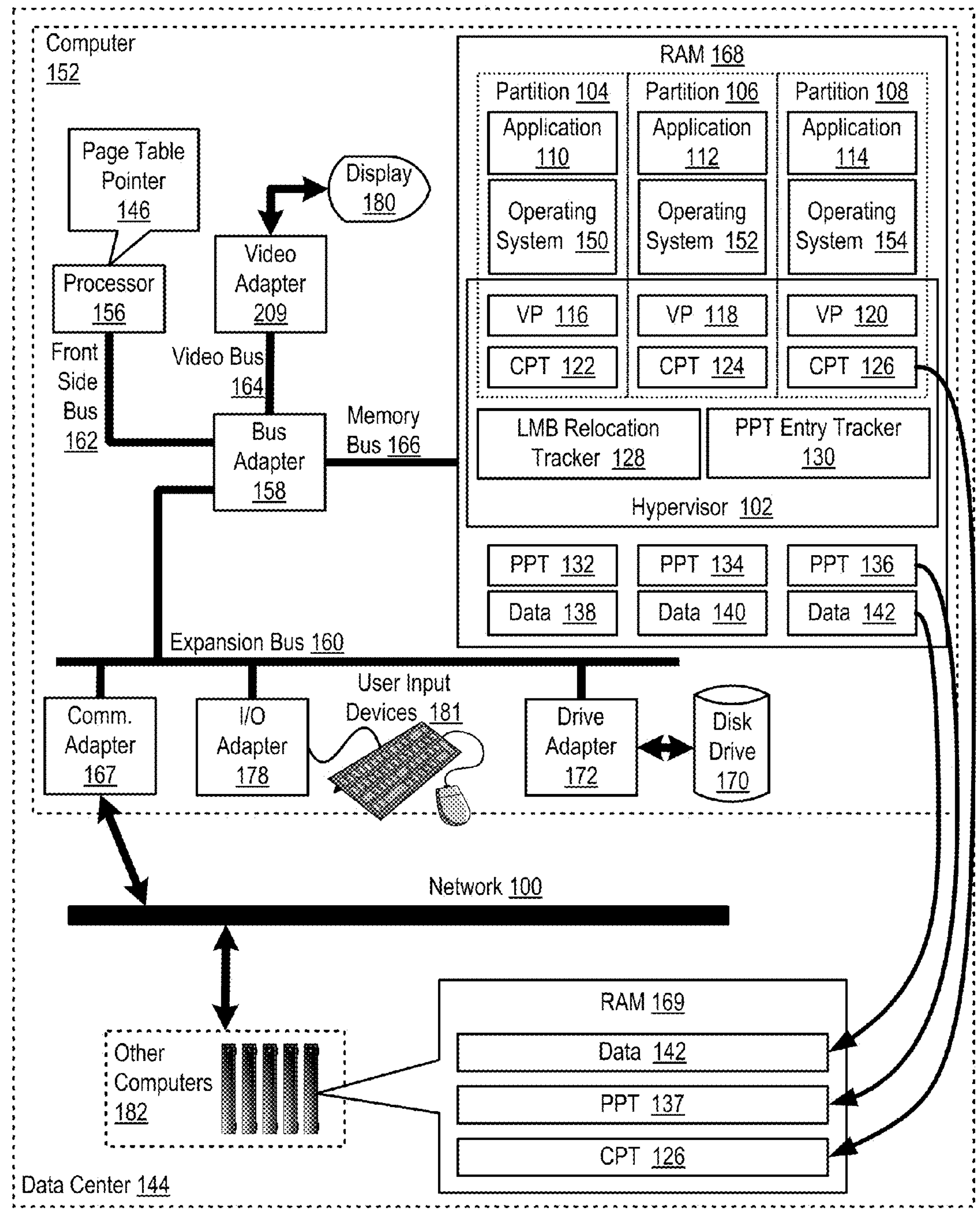
FIG. 1 sets forth a block diagram of a system for relocating page tables and relocating data amongst memory modules in a virtualized environment according to embodiments of the present invention.

Exemplary methods, apparatus, and products for relocating page tables and relocating data amongst memory modules in a virtualized environment in accordance with the present invention are described with reference to the accompanying drawings, beginning with FIG. 1. FIG. 1 sets forth a block diagram of a system for relocating page tables and relocating data amongst memory modules in a virtualized environment according to embodiments of the present invention. The system of FIG. 1 includes a automated computing machinery comprising an exemplary computer (152) useful in relocating page tables and relocating data amongst memory modules in a virtualized environment according to embodiments of the present invention. A memory module as the term is used in this specification refers to a physical device implementing computer memory. As context requires, the term 'memory module' may refer to a memory circuit implemented with other memory circuits as part of a Dual In-line Memory Module ('DIMM'), as a DIMM itself, as a set of DIMMs, or as any other implementation of physical computer memory as will occur to readers of skill in the art. The computer (152) of FIG. 1 includes at least one computer processor (156) or 'CPU' as well as random access memory (168) ('RAM'), including one or more memory modules, which is connected through a high speed memory bus (166) and bus adapter (158) to processor (156) and to other components of the computer (152).

Stored in RAM (168) is a hypervisor (102), a module of automated computing machinery that may comprise any combination of a computer program instructions, computer hardware, and so on. The hypervisor (102) in the example of FIG. 1 maintains the virtualized environment. A hypervisor, also called virtual machine monitor (VMM), is a module of automated computing machinery that performs software and hardware platform-virtualization in order to enable multiple operating systems to run on a host computer concurrently. A hypervisor runs directly on the host's hardware to control hardware access and to monitor guest operating-systems. A guest operating system runs on a level above the hypervisor. The platform virtualization provided by a hypervisor is referred to in this specification as a virtualized environment. A virtualized environment is one in which physical characteristics of a computing platform—computer processors, computer memory, I/O adapters, and the like—are abstracted from the perspective of an operating system and other software applications.

In the example of FIG. 1, the hypervisor maintains a virtualized environment that includes three partitions (104, 106, and 108). A partition as the term is used here is a unique virtual machine provided by the hypervisor within which an operating system and other applications may execute. Each partition (104, 106, and 108) includes an application (110, 112, and 114), an operating system (150, 152, and 154) and a virtual processor (116, 118, and 120). An application (110, 112, and 114) is a module of computer program instructions capable of carrying out user level data processing tasks. Examples of such applications include word processing applications, spreadsheet applications, web server applications, database management applications, media library applications, media playback applications, media transcoding applications, and so on as will occur to readers of skill in the art. Operating systems useful in systems configured to relocate page tables and relocate data amongst memory modules in a virtualized environment according to embodiments of the present invention include UNIX™, Linux™, Microsoft XP™, AIX™, IBM's i5/OS™, and others as will occur to those of skill in the art. A virtual processor is an abstraction of a physical computer processor of a computer, virtualized and presented to a partition. A hypervisor may abstract a computer processor by presenting a separate virtual processor to each partition. In this way, each partition operates independently of other partitions and as if the virtual processor is a computer processor solely used by the partition.

The hypervisor (102) administers memory access for each partition (104, 106, and 108) by use of a set of page tables. A page table is a data structure used by memory systems to abstract computer memory addresses with mappings of one type of address to another. Each of the partitions (104, 106, and 108) in the example of FIG. 1 is associated with a Cache Page Table ('CPT') (122, 124, and 126) and a Physical Page Table ('PPT') (132, 134, and 136). The CPT (122, 124, and 126) is accessible by the operating system (150, 152, and 154) executing in the partition (104, 106, and 108). The PPT (132, 134, and 136) is accessible by a computer processor (156).

The CPT (122, 124, and 126) and the PPT (132, 134, and 136) include virtual to physical address mappings upon creation of the page tables. The hypervisor (102), however, converts the virtual to physical address mappings of the CPT to virtual to logical address mappings. Physical addresses, or real addresses, are addresses electronically presented on a computer address bus to enable the data bus to access particular storage cells of computer memory. Virtual addresses are addresses identifying a virtual, non-physical, entity. Virtual addresses are used as an abstraction of physical addresses. In virtual memory systems, for example, a contiguous block of logical addresses may be presented to an operating system, while physical addresses mapped to the logical addresses are not contiguous. Logical addresses are addresses used internally by the hypervisor (102) in administering memory accesses by a partition. The hypervisor (102) maintains a table mapping logical addresses to corresponding physical addresses.

The hypervisor (102) in the example of FIG. 1 is capable of relocating the page tables amongst memory modules in the virtualized environment according to embodiments of the present invention. In the example of FIG. 1, the hypervisor (102) relocates CPT (126) to RAM (169) and a PPT (136) to a target PPT (137) memory location. The hypervisor (102) may relocate the page tables amongst memory modules in the virtualized environment by relocating the CPT (126) in portions from a source memory location (168) to a target memory location (169). Each portion of the CPT including one or more CPT entries, virtual to logical address mappings. Relocating the CPT in portions includes initializing an index value representing a next CPT entry to be relocated, and for each portion: suspending the partition (108), relocating the portion to a target memory location (169), setting the index value to represent the next CPT entry of the portion, and resuming operation of the partition (108). The hypervisor (102) may relocate all valid entries of the PPT (136) to the target PPT (137) memory location by initializing the target PPT (137) memory location with invalid entries; changing a page table pointer (146) of the computer processor (156) from the PPT (136) to the target PPT (137) memory location; and individually for each valid entry of the PPT (136): setting a lock blocking access to the entry, relocating the entry to the target PPT (137) memory location, invalidating the entry in the PPT (136), and releasing the lock.

The hypervisor (102) in the example of FIG. 1 is capable of relocating data (138, 140, and 142) amongst memory modules in a virtualized environment according to embodiments of the present invention. In the example of FIG. 1, the hypervisor (102) relocates the data (142) from RAM (168) to RAM (169). The hypervisor (102) may relocate the data (142) by converting the virtual to physical address mappings of the CPT to virtual to logical address mappings—if the mappings have not been converted as mentioned above. The hypervisor (102) may also establish a Logical Memory Block ('LMB') relocation tracker (128). An LMB is a memory segment of a particular size. The LMB relocation tracker (128) includes logical addresses of an LMB to be relocated, source physical addresses (168) of the LMB to be relocated, target physical addresses (169) of the LMB to be relocated, a translation block indicator for each relocation granule of the LMB, and a pin count associated with each relocation granule. A relocation granule is a portion of an LMB. The pin count represents a number of outstanding translations to the associated relocation granule.

The hypervisor (102) may also establish a PPT entry tracker (130) that includes PPT entries corresponding to the LMB to be relocated. The hypervisor (102) may also relocate the LMB in a number of relocation granules in dependence upon the PPT entry tracker (130) and the LMB relocation tracker (128) including blocking translations to the relocation granules during relocation. Upon relocation of all granules in the LMB, the hypervisor (102) may remove, from the LMB relocation tracker, the logical addresses of the LMB to be relocated.

The hypervisor (102), operating systems (150, 152, and 154), the applications (110, 112, and 114), CPTs (122, 124, and 126), PPTs (132, 134, and 136) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for relocating page tables and relocating data amongst memory modules in a virtualized environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for relocating page tables and relocating data amongst memory modules in a virtualized environment according to embodiments of the present invention include modems for wired dial-up communications, Ethernet (IEEE 802.3) adapters for wired data communications network communications, and 802.11 adapters for wireless data communications network communications.

The arrangement of computers (182, 152), partitions (104, 106, and 108), hypervisor (102), memory modules (168, 169), and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
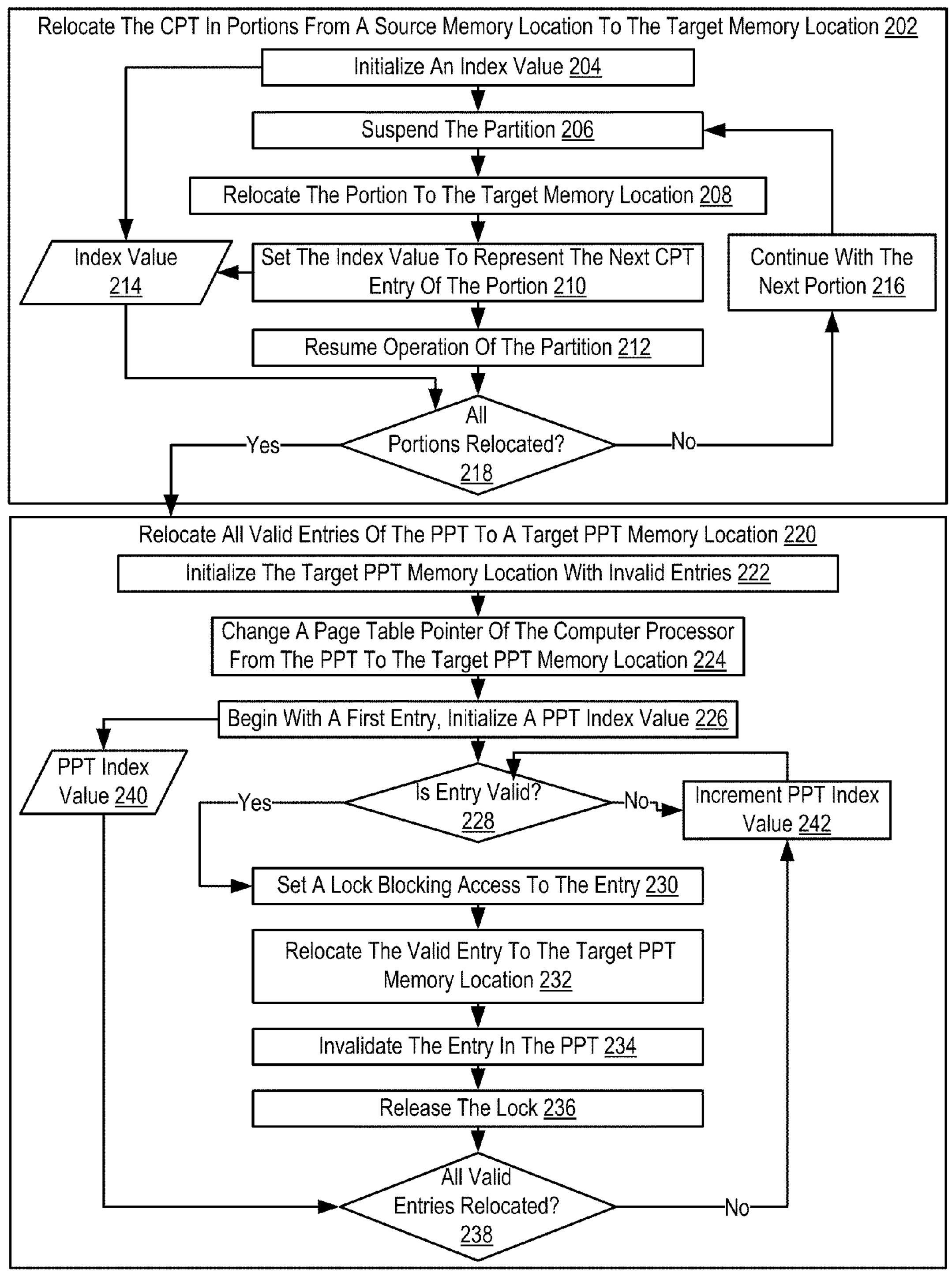
FIG. 2 sets forth a flow chart illustrating an exemplary method for relocating page tables amongst memory modules in a virtualized environment according to embodiments of the present invention.

For further explanation, FIG. 2 sets forth a flow chart illustrating an exemplary method for relocating page tables amongst memory modules in a virtualized environment according to embodiments of the present invention. The page tables in the method of FIG. 2, a CPT and a PPT, are similar to the CPTs and PPTs in the example of FIG. 1. The CPT includes virtual to logical address mappings. That is, the virtual to physical addresses that the CPT includes upon establishment of the CPT have been converted to virtual to logical address mappings by the hypervisor. The CPT is accessible by an operating system executing in a partition of the virtualized environment maintained by a hypervisor. The PPT includes virtual to physical address mappings and is accessible by a computer processor. The method of FIG. 2 is carried out by a hypervisor similar to the hypervisor (102) of FIG. 1.

The method of FIG. 2 includes relocating (202) the CPT in portions from a source memory location to a target memory location. Each portion of the CPT includes one or more CPT entries. In the method of FIG. 2, relocating (202) the CPT in portions includes initializing (204) an index value (214) representing a next CPT entry to be relocated. An index value is a value that represents an entry in a page table. The index value (214) may be used as an index into a CPT. Initializing the index value may be carried out by setting the index value to zero, the first CPT entry.

In the method of FIG. 2, relocating (202) the CPT in portions also includes suspending (206) the partition. Suspending (206) the partition may be carried out by halting operation of a virtual processor presented to the partition by the hypervisor. In this way, execution of software in the partition will halt.

In the method of FIG. 2, relocating (202) the CPT in portions also includes relocating (208) the portion to the target memory location. Relocating (208) the portion to the target memory location may be carried out by storing in the target memory location virtual to logical address mappings of the CPT entries of the portion of the CPT being relocated.

In the method of FIG. 2, relocating (202) the CPT in portions also includes setting (210) the index value (214) to represent the next CPT entry of the portion to be relocated. Setting (210) the index value (214) to represent the next CPT entry of the portion to be relocated may be carried out by incrementing the index value (214) or by setting the index value to the next entry after the last CPT entry relocated.

In the method of FIG. 2, relocating (202) the CPT in portions also includes resuming (212) operation of the partition. Resuming (212) operation of the partition may be carried out by restarting operating of the virtual processor presented to the partition.

In the method of FIG. 2, relocating (202) the CPT in portions also includes determining (218) whether all portions of the CPT have been relocated. Determining (218) whether all portions of the CPT are relocated may be carried out by determining whether the index value is greater than the number of CPT entries, that is, whether the index value points to an entry past the last entry of the CPT.

If all portions of the CPT have not been relocated, the method of FIG. 2 continues (216) with the next portion. In this way, the steps of suspending (206), relocating (208), setting (210), and resuming (212) are carried out for each portion of the CPT until all portions have been relocated to the target memory location.

If all portions of the CPT have been relocated, the method of FIG. 2 continues by relocating (220) all valid entries of the PPT to a target PPT memory location. In the method of FIG. 2, relocating (220) all valid entries of the PPT to the target PPT memory location includes initializing (222) the target PPT memory location with invalid entries. Initializing (222) the target PPT memory location with invalid entries may be carried out by setting, for each PPT entry, a valid bit associated with the entry to represent that the entry is invalid.

In the method of FIG. 2, relocating (220) all valid entries of the PPT to the target PPT memory location also includes changing (224) a page table pointer of the computer processor from the PPT to the target PPT memory location. Changing (224) a page table pointer of the computer processor may be carried out by storing a memory address of the target PPT memory location, a pointer, in a register of a computer processor designated for use as a page table pointer.

In the method of FIG. 2, relocating (220) all valid entries of the PPT to the target PPT memory location continues by initializing (226) a PPT index value (240) to represent a first entry of the PPT. Initializing (226) a PPT index value (240) to represent a first entry of the PPT may be carried out by setting the PPT index value to zero.

In the method of FIG. 2, relocating (220) all valid entries of the PPT to the target PPT memory location also includes determining (228) whether the PPT entry is valid. Determining (228) whether the PPT entry is valid may be carried out by determining whether the valid bit associated with the PPT entry is set to indicate the PPT entry is valid. If the PPT entry is invalid, relocating (220) all valid entries of the PPT to the target PPT memory location in method of FIG. 2 continues by incrementing (242) the PPT index value (242) and determining (228) if the PPT entry represented by the incremented PPT index value (240) is valid. The steps of determining (228) and incrementing (242) are carried out until a PPT entry is valid.

If the PPT entry is valid, relocating (220) all valid entries of the PPT to the target PPT memory location in method of FIG. 2 continues by setting (230) a lock blocking access to the entry. A 'lock' as the term is used here is bimodal variable having two states, a locked and unlocked. The value of the variable indicates whether the lock is set. A lock may be implemented as a bit associated with a PPT entry, as a variable, the value of which indicates whether the lock is set, and in other ways as will occur to readers of skill in the art. If the PPT entry is locked, access is blocked by the hypervisor.

In the method of FIG. 2, relocating (220) all valid entries of the PPT to the target PPT memory location also includes relocating (232) the entry to the target PPT memory location. Relocating (232) the entry to the target PPT memory location may be carried out by copying the contents of the PPT entry of the PPT, such as, address mappings, a valid bit, and the like, to a corresponding entry in the target PPT memory location.

In the method of FIG. 2, relocating (220) all valid entries of the PPT to the target PPT memory location also includes invalidating (234) the entry in the PPT. Invalidating (234) the entry in the PPT may be carried out by setting the valid bit in the PPT to indicate the PPT entry is invalid.

In the method of FIG. 2, relocating (220) all valid entries of the PPT to the target PPT memory location also includes releasing (236) the lock. Releasing (236) the lock may be carried out by switching the value of the lock to an unlocked state.

In the method of FIG. 2, relocating (220) all valid entries of the PPT to the target PPT memory location also includes determining (238) whether all valid entries have been relocated. Determining (238) whether all valid entries have been relocated may be carried out by determining whether the PPT entry index value is greater than (when the first PPT entry is indexed by a one) or equal to (when the first PPT entry is indexed by a zero) the number of PPT entries in the PPT. If all valid entries have not been relocated, relocating (220) in the method of FIG. 2 continues by incrementing (242) the PPT index value (240). If all valid entries have been relocated, the method of FIG. 2 is complete. That is, the PPT has been relocated to the target PPT memory location and the CPT has been relocated to the target memory location.

By increment (242) the PPT index value, determining (228) whether the PPT entry is valid, and determining (238) whether all valid PPT entries have been relocated, the steps of setting (230), relocating (232), invalidating (234), and releasing (236) are carried out individually, for each valid entry of the PPT until all valid entries of the PPT have been relocated.

Figure 3:
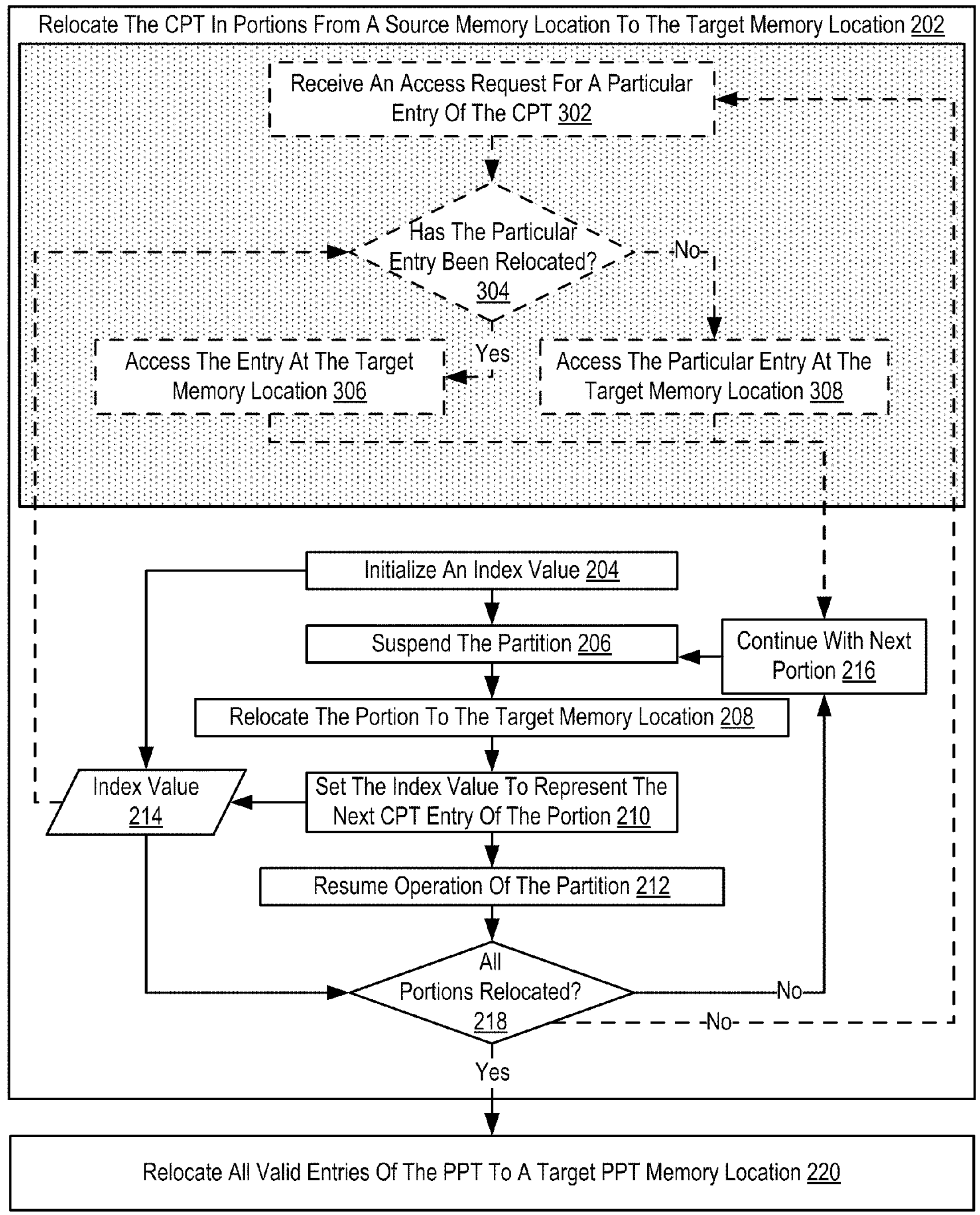
FIG. 3 sets forth a flow chart illustrating a further exemplary method for relocating page tables amongst memory modules in a virtualized environment according to embodiments of the present invention.

For further explanation, FIG. 3 sets forth a flow chart illustrating a further exemplary method for relocating page tables amongst memory modules in a virtualized environment according to embodiments of the present invention. The method of FIG. 3 is similar to the method of FIG. 2 in that in the method of FIG. 3, the page tables include a CPT similar to the CPTs (122, 124, and 126) of FIG. 1 and a PPT, similar to the PPTs (132, 134, and 136) of FIG. 1. Like the example of FIG. 2, the CPT of FIG. 3 includes virtual to logical address mappings, having already been converted from virtual to physical address mappings. The method of FIG. 3 is also carried out by hypervisor similar to the hypervisor (102) of FIG. 1.

The method of FIG. 3 is also similar to the method of FIG. 2 in that that method of FIG. 3 includes relocating (202) the CPT in portions from a source memory location to a target memory location and relocating (220) all valid entries of the PPT to a target PPT memory location, all of which operate as described above.

In the method of FIG. 3, however, relocating (202) the CPT in portions from a source memory location to a target memory location also includes an asynchronous event, receiving (302) an access request for a particular entry of the CPT. The step of receiving (302) an access request for a particular entry of the CPT is described as an asynchronous event because the step occurs prior to relocating all portions of the CPT. That is, at any time the hypervisor relocating portions of the CPT—carrying out the steps of initializing (204), suspending (206), relocating (208), setting (210), and resuming (212)—the hypervisor may receive (302) an access request for a particular entry of the CPT (302). The asynchronous event and the method steps carried out in response to the asynchronous event are depicted in the example of FIG. 3 in a shaded region, with the method steps and data flow lines being dashed.

Upon receiving (302) an access request for a particular entry of the CPT, the method of FIG. 2 includes determining (304), in dependence upon the index value (214), whether the particular entry has been relocated. Determining (304) whether the particular entry has been relocated may be carried out by determining whether the index of the particular CPT entry is less than the index value (214). If the index of the particular CPT entry is less than the index value (214), the entry has been relocated. If the index of the particular CPT entry is not less than the index value (214), the entry has not been relocated.

If the particular entry has been relocated, the method of FIG. 3 continues by accessing (306) the entry at the target memory location. If the particular entry has not been relocated, the method of FIG. 3 includes accessing (308) the particular entry at the source target memory location. The steps of receiving (302), determining (304), accessing (306), and accessing (308) in the method of FIG. 3, enable a hypervisor to continue to grant access requests while relocating the CPT. These steps may be carried out with the process of relocating portions of the CPT halted, or in a parallel with the relocation of the CPT portions.

Figure 4:
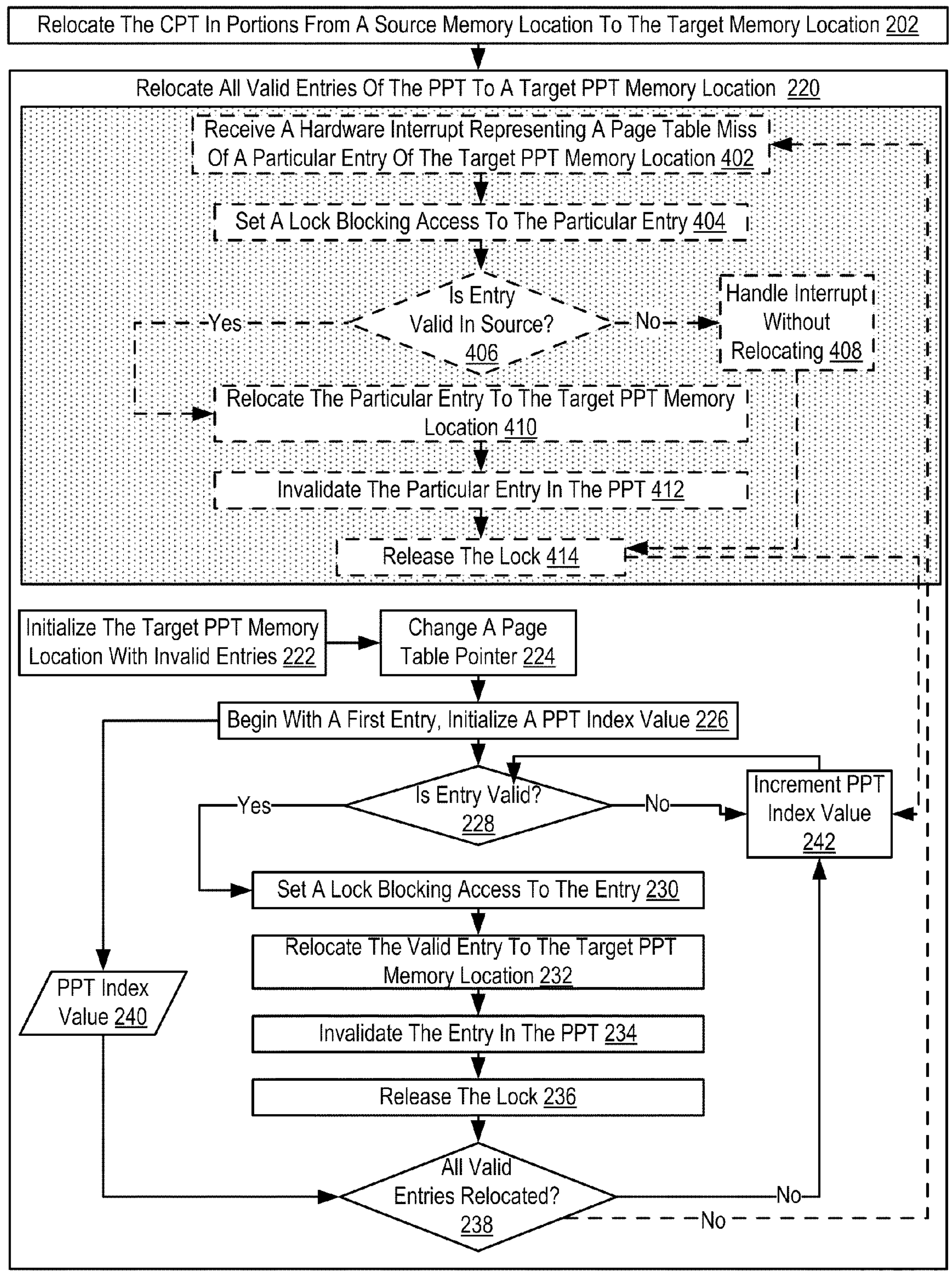
FIG. 4 sets forth a flow chart illustrating a further exemplary method for relocating page tables amongst memory modules in a virtualized environment according to embodiments of the present invention.

For further explanation, FIG. 4 sets forth a flow chart illustrating a further exemplary method for relocating page tables amongst memory modules in a virtualized environment according to embodiments of the present invention. The method of FIG. 4 is similar to the method of FIG. 2 in that in the method of FIG. 4, the page tables include a CPT similar to the CPTs (122, 124, and 126) of FIG. 1 and a PPT, similar to the PPTs (132, 134, and 136) of FIG. 1. Like the example of FIG. 2, the CPT of FIG. 4 includes virtual to logical address mappings, having already been converted from virtual to physical address mappings. The method of FIG. 4 is also carried out by hypervisor similar to the hypervisor (102) of FIG. 1.

The method of FIG. 4 is also similar to the method of FIG. 2 in that that method of FIG. 4 includes relocating (202) the CPT in portions from a source memory location to a target memory location and relocating (220) all valid entries of the PPT to a target PPT memory location, all of which operate as described above.

The method of FIG. 4 differs from the method of FIG. 2, however, in that in the method of FIG. 4 relocating (220) all valid entries of the PPT to a target PPT memory location includes an asynchronous event and method carried out in response to the asynchronous event, depicted in the example of FIG. 4 in a shaded region with method steps and data flows lines being dashed.

Prior to all valid entries of the PPT being relocated to the target PPT memory location, that is, during relocation of the PPT entries, the method of FIG. 4 includes receiving (402) from the computer processor a hardware interrupt representing a page table miss of a particular entry of the target PPT memory location. A processor may trigger a page table miss and a hardware interrupt when attempting to access a PPT entry that is not valid. Because the processor is set to attempt access to PPT entries in the target PPT memory location and all entries in the target PPT memory location are invalidated prior to relocating entries, there are two reasons that a page table miss may occur at the target PPT memory location: first, the PPT entry that the processor is attempting to access has not yet been relocated to the target PPT memory location, leaving only the initial invalidated entry at the target PPT memory location; second, the PPT entry has been invalidated in the normal course of memory operations after being relocated to the target PPT memory location entry.

The method of FIG. 4 also includes setting (404) a lock blocking access to the particular entry and determining (404) whether the particular entry is valid in the PPT. If the particular entry is invalid in the PPT, the method of FIG. 4 continues by handling the interrupt without relocating a PPT entry. That is, if the particular entry is invalid in the PPT, the entry has been previously relocated to the target PPT memory location and the entry in the target PPT memory location has been invalidated in the normal course of memory operations. If the particular entry is valid in the PPT—meaning the particular entry has not yet been relocated to the target PPT memory location—the method of FIG. 4 continues by relocating (410) the particular entry to the target PPT memory location, invalidating (412) the particular entry in the PPT, and releasing (414) the lock blocking access to the particular entry.

The asynchronous event and the method carried out in response to the asynchronous event may be carried out in parallel with the individual relocation of each PPT entry. The method carried out in response to the asynchronous event enables a hypervisor to administer memory accesses to the PPT during relocation of the PPT entries. As such, operation of the partition and the processor need not be halted for the duration of the relocation.

Figure 5:
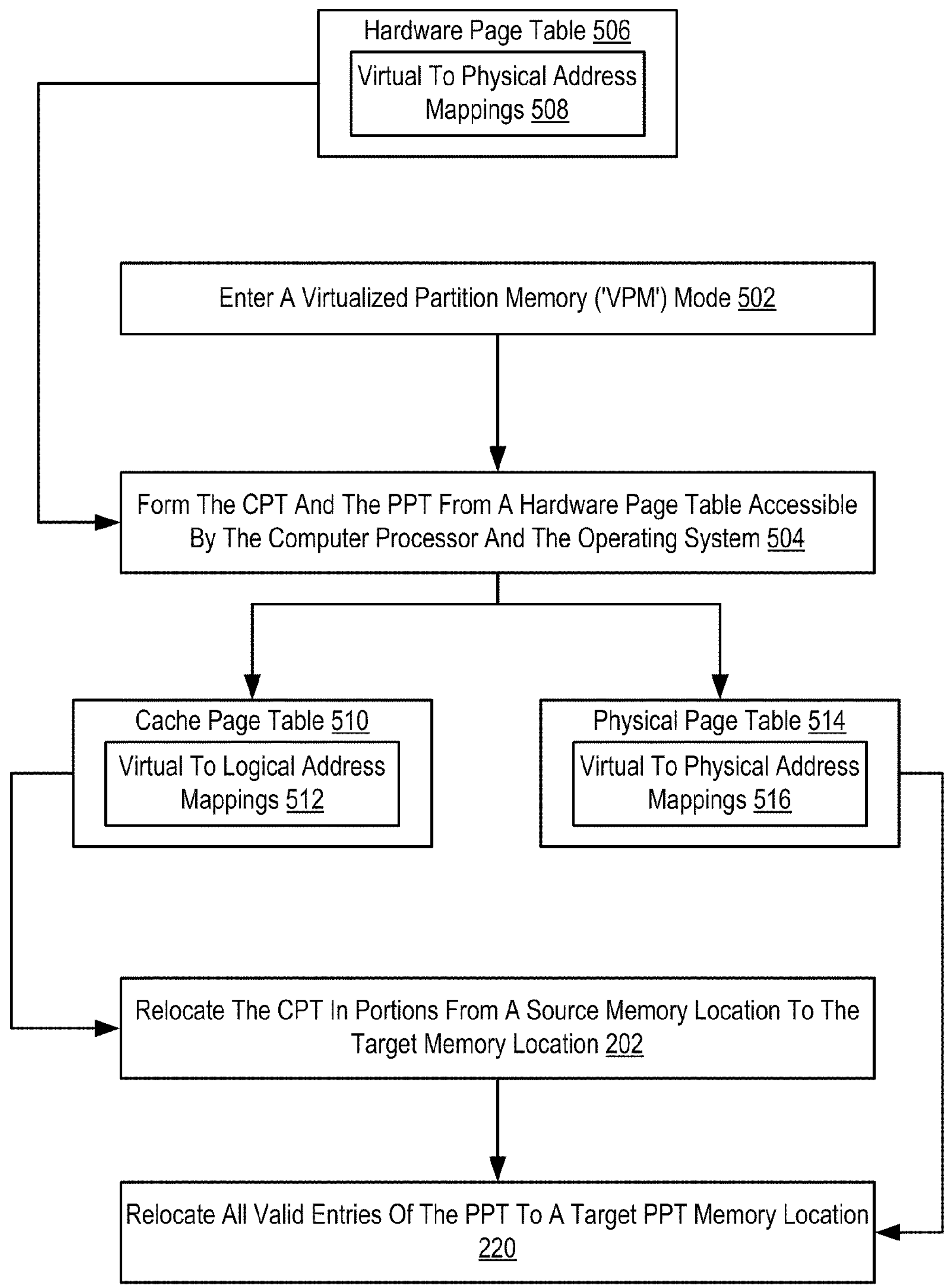
FIG. 5 sets forth a flow chart illustrating a further exemplary method for relocating page tables amongst memory modules in a virtualized environment according to embodiments of the present invention.

For further explanation, FIG. 5 sets forth a flow chart illustrating a further exemplary method for relocating page tables amongst memory modules in a virtualized environment according to embodiments of the present invention. The method of FIG. 5 is similar to the method of FIG. 2 in that in the method of FIG. 5, the page tables include a CPT similar to the CPTs (122, 124, and 126) of FIG. 1 and a PPT, similar to the PPTs (132, 134, and 136) of FIG. 1. The method of FIG. 5 is also carried out by hypervisor similar to the hypervisor (102) of FIG. 1.

The method of FIG. 5 is also similar to the method of FIG. 2 in that that method of FIG. 5 includes relocating (202) the CPT in portions from a source memory location to a target memory location and relocating (220) all valid entries of the PPT to a target PPT memory location, all of which operate as described above.

The method of FIG. 5 differs from the method of FIG. 2, however, in that the method of FIG. 5 includes entering (502) a Virtualized Partition Memory (‘VPM’) mode. VPM mode is a mode of operation of the hypervisor in which page tables are virtualized for partition, the hypervisor handles storage interrupts such as an instruction storage interrupt or data storage interrupt, and the hypervisor responds to page table misses.

Upon entering VPM mode, the method of FIG. 5 continues by forming (504) the CPT (510) and the PPT (514) from a hardware page table (506) accessible by the computer processor and the operating system. The hardware page table (506) includes virtual to physical address mappings (508). Forming (504) the CPT (510) is carried out by blocking access of the hardware page table (506) by the computer processor. That is, the hardware page table (506) is used as the CPT (510). Forming the CPT (510) may further include converting the virtual to physical address mappings (508) to virtual to logical address mappings (512) maintained by the hypervisor. Forming the PPT (514) includes halting the partition’s processor and setting a page table pointer of the processor, implemented, for example, as a register that includes a starting memory address and size of a page table, to point to a new PPT.

Figure 6:
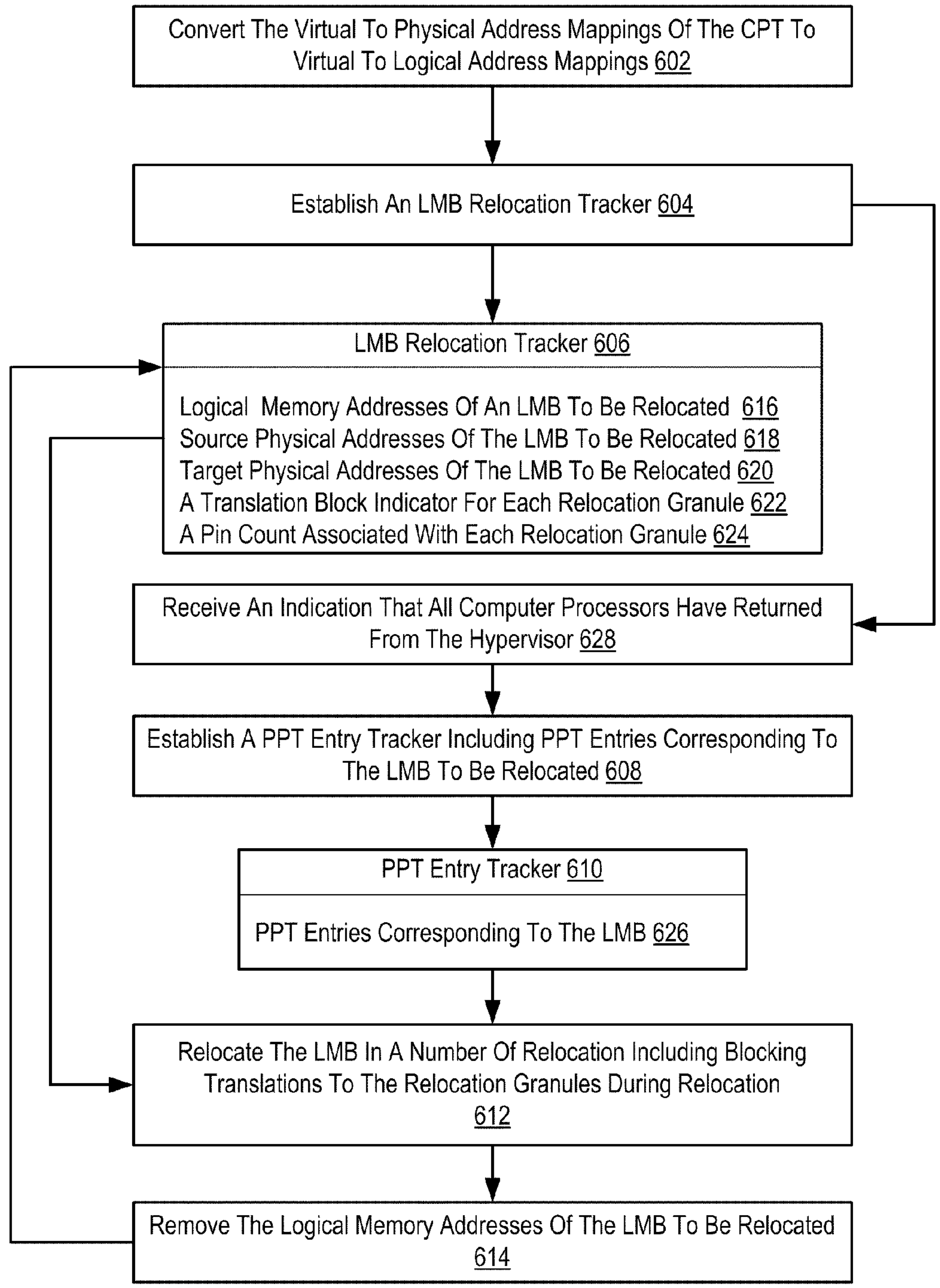
FIG. 6 sets forth a flow chart illustrating an exemplary method for relocating data amongst memory modules in a virtualized environment maintained by a hypervisor according to embodiments of the present invention.

For further explanation, FIG. 6 sets forth a flow chart illustrating an exemplary method for relocating data amongst memory modules in a virtualized environment maintained by a hypervisor according to embodiments of the present invention. The page tables in the method of FIG. 6, a CPT and a PPT, are similar to the CPTs (122, 124, and 126) and PPTs (132, 134, and 136) in the example of FIG. 1. The CPT includes virtual to physical address mappings and is accessible by an operating system executing in a partition of the virtualized environment. The PPT includes virtual to physical address mappings and is accessible by a computer processor. The method of FIG. 6 is carried out by a hypervisor similar to the hypervisor (102) of FIG. 1.

The method of FIG. 6 includes converting (602) the virtual to physical address mappings of the CPT to virtual to logical address mappings. Converting (602) is described in detail below with respect to FIG. 7. The method of FIG. 6 also includes establishing (604) an LMB relocation tracker. The LMB relocation tracker (606) includes logical addresses (616) of an LMB to be relocated, source physical addresses (618) of the LMB to be relocated, target physical addresses (620) of the LMB to be relocated, a translation block indicator (622) for each relocation granule of the LMB, and a pin count (624) associated with each relocation granule. The pin count (624) represents a number of outstanding translations to the associated relocation granule. That is, the hypervisor maintains the pin count (624) for each relocation granule, incrementing the pin count when a translation to the granule is requested, and decrementing the pin count when the translation is complete.

As mentioned above, the hypervisor maintains a page table mapping logical addresses to physical addresses. As such, establishing (604) an LMB relocation tracker (606) may be carried out by storing in a data structure logical addresses (616) of the LMB identified from the hypervisor’s page table, source physical address (618) of the LMB identified from the hypervisor’s page table, and the target physical addresses (620) of the LMB. Establishing (604) an LMB relocation tracker (606) may also include initializing the translation block indicator of each relocation granule to indicate that the translation is not presently blocked and initializing the pin count associated with each relocation granule to zero.

After establishing (604) the LMB relocation tracker (606), the method of FIG. 6 continues by receiving (628) an indication that all computer processors have returned from the hypervisor. That is, the hypervisor receives an indication that any outstanding processes taking place during creation of the LMB relocation tracker are complete and any further processes may be handled using the LMB relocation tracker.

The method of FIG. 6 also includes establishing (608) a PPT entry tracker (610). The PPT entry tracker (610) in the method of FIG. 6 includes PPT entries (626) corresponding to the LMB to be relocated. Establishing (608) a PPT entry tracker (610) is described below in detail with respect to FIG. 9.

The method of FIG. 6 also includes relocating (612) the LMB in a number of relocation granules in dependence upon the PPT entry tracker (610) and the LMB relocation tracker (606) including blocking translations to the relocation granules during relocation. Relocating (612) the LMB is described below in detail with respect to FIG. 8.

Upon relocation of all granules in the LMB, the method of FIG. 6 includes removing (614), from the LMB relocation tracker (606), the logical addresses (616) of the LMB to be relocated. Removing (614) the logical addresses (616) of the LMB enabled the LMB relocation tracker (606) to indicate that no LMB is currently relocating.

Figure 7:
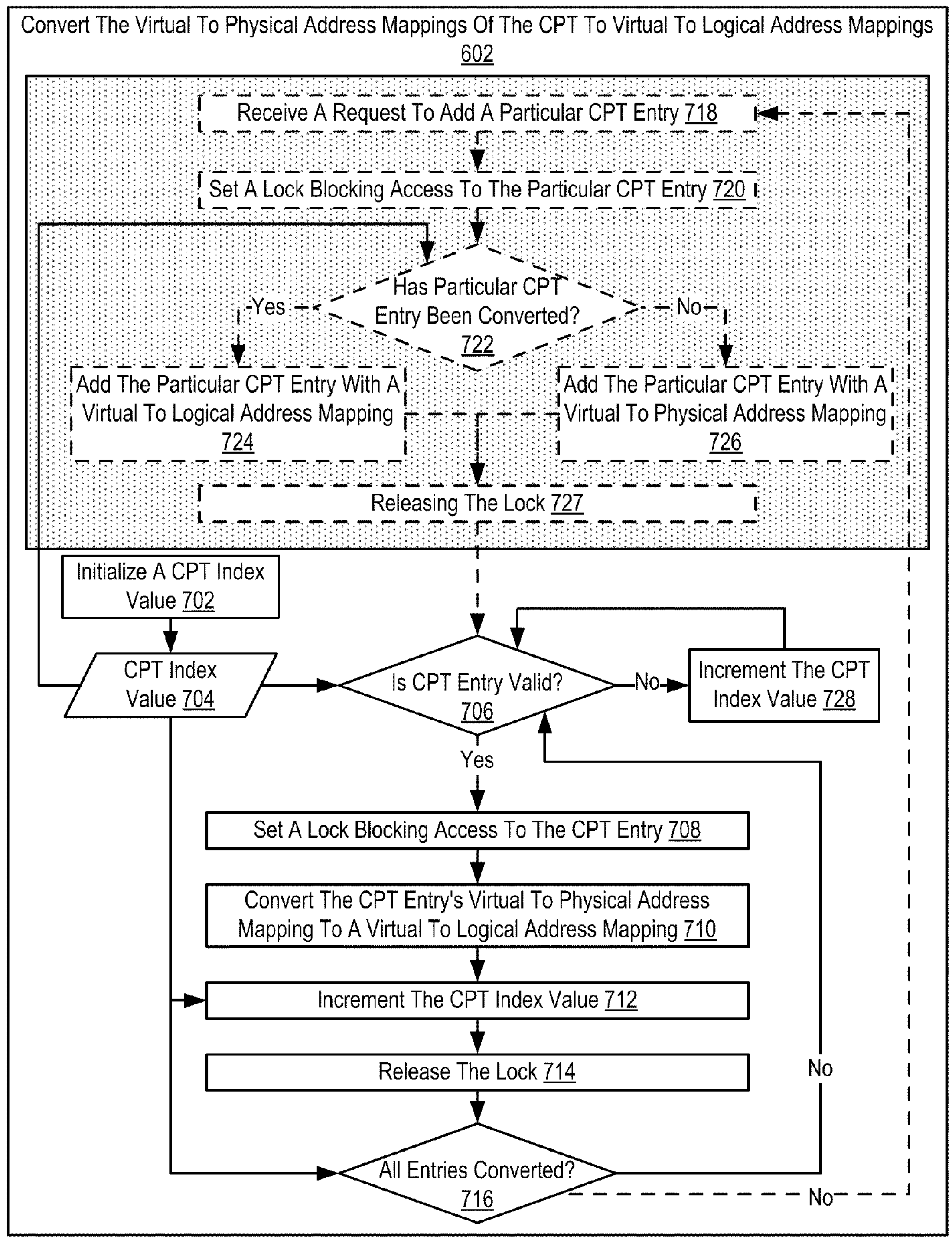
FIG. 7 sets forth a flow chart illustrating an exemplary method for converting the virtual to physical address mappings of the CPT to virtual to logical address mappings.

For further explanation of the method of FIG. 6, FIG. 7 sets forth a flow chart illustrating an exemplary method for converting (602) the virtual to physical address mappings of the CPT to virtual to logical address mappings. The method of FIG. 7 includes initializing (702) a CPT index value (704) representing a first CPT entry including a virtual to physical address mapping. The method of FIG. 7 also includes determining (706) whether the first CPT entry including a virtual to physical address mapping is valid. If the first CPT entry including a virtual to physical address mapping is invalid, the method of FIG. 7 continues by incrementing (728) the CPT index value to a next CPT entry including a virtual to physical address mapping and again determining (706) whether the CPT entry is valid. The steps of determining (706) and incrementing (728) continue until a CPT entry containing a virtual to physical address mapping is valid.

If the first CPT entry including a virtual to physical address mapping is valid, the method of FIG. 7 continues by setting (708) a lock blocking access to the CPT entry, converting (710) the CPT entry’s virtual to physical address mapping to a virtual to logical address mapping through use of the hypervisor’s internal page table, incrementing (712) the CPT index value (704), and releasing (714) the lock blocking access to the CPT entry.

During the conversion of the CPT entries, the method of FIG. 7 includes an asynchronous event and a method carried out in response to that event, depicted in the shaded region of FIG. 7, where the method steps and data flow lines are dashed. In the method of FIG. 7, during the conversion of the CPT entries, the hypervisor may receive (718) a request to add a particular CPT entry. In response to this asynchronous event, the method of FIG. 7 includes setting (720) a lock blocking access to the particular CPT entry and determining (722) in dependence upon the CPT index value (704) whether the particular CPT entry has been converted to include a virtual to logical address mapping. If the particular CPT entry has been converted, the method of FIG. 7 continues by adding (724) the particular CPT entry with a virtual to logical address mapping. If the particular CPT entry has not been converted, the method of FIG. 7 continues by adding (726) the particular CPT entry with a virtual to physical address mapping. The method of FIG. 7 also includes releasing (727) the lock. In this way, entries added to the CPT with virtual to physical address mappings will be converted in the normal course of operation of the non-asynchronous conversion process depicted by method steps (706, 728, 708, 710, 712, 714, and 716). Also, the method carried out in response to the asynchronous event of receiving (718) a request to add a particular entry, enables the hypervisor to administer requests to add CPT entries during the conversion process from virtual to physical address mappings to virtual to logical address mappings. From the perspective of the partition, the entire conversion process is transparent and additions to the CPT occur without interruption.

Figure 8:
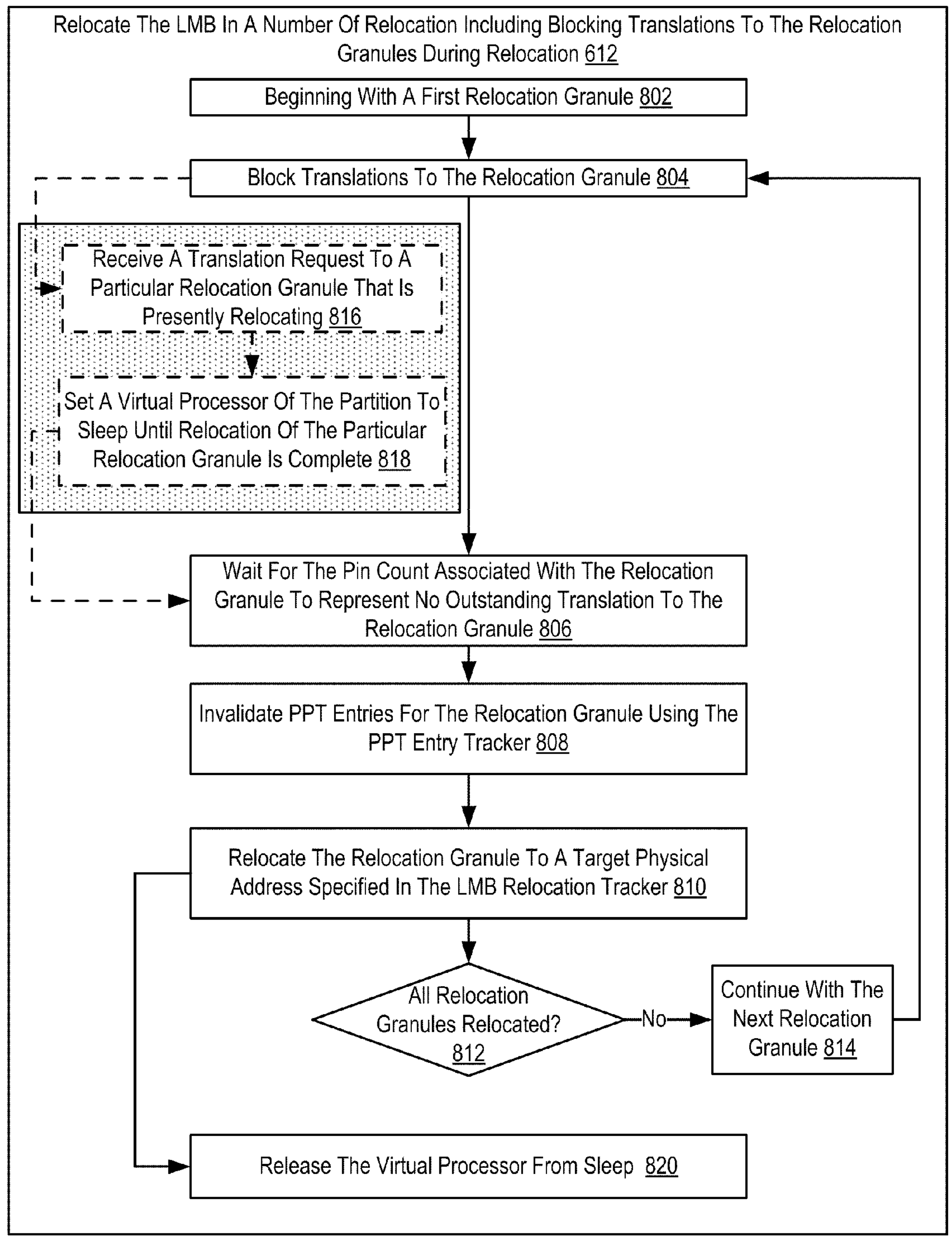
FIG. 8 sets forth a flow chart illustrating an exemplary method for relocating the LMB in a number of relocation granules according to embodiments of the present invention.

For further explanation of the method of FIG. 6, FIG. 8 sets forth a flow chart illustrating an exemplary method for relocating (612) the LMB in a number of relocation granules according to embodiments of the present invention. The method of FIG. 8 is carried out for each relocation granule of the LMB, beginning (802) with a first relocation granule.

The method of FIG. 8 includes blocking (804) translations to the relocation granule. Blocking (804) translations to the relocation granule may be carried out by setting the translation block indicator (622 of FIG. 6) for the relocation granule in the LMB relocation tracker (606 of FIG. 6) to indicate that translation to memory addresses of the relocation granule are blocked. Upon receiving requests for translation to a memory address in the relocation granule, the hypervisor inspects the LMB relocation tracker. Upon identifying that the translation block indicator for the memory addresses in the relocation granule is set, the hypervisor blocks the translation.

The method of FIG. 8 also includes waiting (806) for the pin count (624) associated with the relocation granule to represent no outstanding translations to the relocation granule and invalidating (808) PPT entries for the relocation granule using the PPT entry tracker (610 of FIG. 6). The hypervisor (808) invalidates (808) PPT entries for the relocation granule by looking up the PPT entries corresponding to the relocation granule in the PPT entry tracker (610) and setting the valid bit of the PPT entries to indicate an invalid entry. The method of FIG. 8 also includes relocating (810) the relocation granule to a target physical address specified in the LMB relocation tracker (606 of FIG. 6). The method of FIG. 8 also includes determining (812) whether all relocation granules have been relocated. If all relocation granules have not been relocated, the method of FIG. 8 continues with the next relocation granule (814) of the LMB.

The method of FIG. 8 also includes receiving (816) a translation request to a particular relocation granule that is presently relocating. That is, the hypervisor may receive (816), asynchronously with respect to the relocation of granules, a translation request for a relocation granule that is presently being relocated. The method of FIG. 8 also includes setting (818) a virtual processor of the partition to sleep until relocation of the particular relocation granule is complete. The hypervisor may maintain a list of virtual processors put to sleep during relocation of relocation granules. Upon relocation of the particular granule in the LMB, the method of FIG. 8 continues by releasing (820) the virtual processor from sleep.

Figure 9:
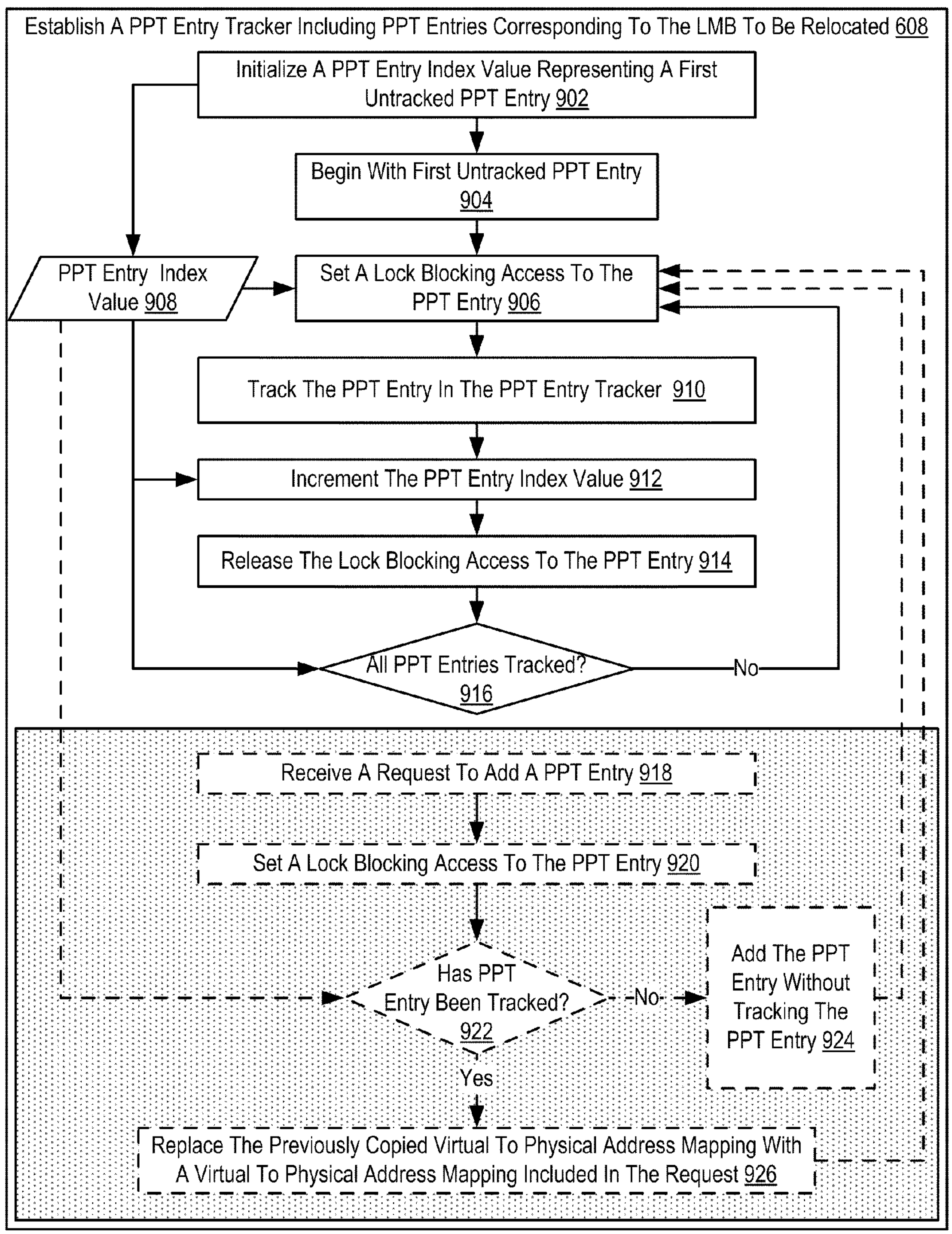
FIG. 9 sets forth a flow chart illustrating an exemplary method for establishing a PPT entry tracker according to embodiments of the present invention.

For further explanation of the method of FIG. 6, FIG. 9 sets forth a flow chart illustrating an exemplary method for establishing (608) a PPT entry tracker according to embodiments of the present invention. The method of FIG. 9 includes initializing (902) a PPT entry index value (908) representing a first untracked PPT entry. The method of FIG. 9 continues for each PPT entry corresponding to the LMB to relocated, beginning (904) with the first untracked PPT entry, setting (906) a lock blocking access to the PPT entry. The method of FIG. 9 also includes tracking (910) the PPT entry in the PPT entry tracker, incrementing (912) the PPT entry index value, and releasing (914) the lock blocking access to the PPT entry.

The method of FIG. 9 also includes determining whether all PPT entries corresponding to the LMB to be relocated are being tracked in the PPT entry tracker. If all PPT entries corresponding to the LMB to be relocated are being tracked in the PPT entry tracker, the PPT entry tracker is established. If all PPT entries corresponding to the LMB to be relocated are not yet being tracked in the PPT entry tracker, the method continues by setting (906) a lock blocking access to the next PPT entry—the entry identified by the PPT entry index value (908).

In the method of FIG. 9, during the tracking of all PPT entries corresponding to the LMB to be relocated to the PPT entry tracker, the hypervisor may receive (918) a request to add a PPT entry. Upon receiving such a request, the method of FIG. 9 includes setting (920) a lock blocking access to the PPT entry and determining (922) in dependence upon the PPT entry index value whether the PPT entry has been previously tracked in the PPT entry tracker. If the PPT entry has been previously tracked in the PPT entry tracker, the method of FIG. 9 continues by replacing (926) the previously copied virtual to physical address mapping with a virtual to physical address mapping included in the request to add the PPT entry. If the PPT entry has not been previously tracked in the PPT entry tracker, the method of FIG. 9 continues by adding (924) the PPT entry without tracking the PPT entry in the PPT entry tracker.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of relocating page tables amongst memory modules in a virtualized environment, the page tables comprising a Cache Page Table ('CPT') and a Physical Page Table ('PPT'), the CPT comprising virtual to logical address mappings, the CPT accessible by an operating system executing in a partition of the virtualized environment maintained by a hypervisor, the PPT comprising virtual to physical address mappings, the PPT accessible by a computer processor, the method comprising:

relocating the CPT in portions from a source memory location to a target memory location, each portion of the CPT including one or more CPT entries, wherein relocating the CPT in portions includes:

initializing an index value representing a next CPT entry to be relocated; and for each portion: suspending the partition, relocating the portion to the target memory location, setting the index value to represent the next CPT entry of the portion to be relocated, and resuming operation of the partition; and relocating all valid entries of the PPT to a target PPT memory location including:

initializing the target PPT memory location with invalid entries;

changing a page table pointer of the computer processor from the PPT to the target PPT memory location; and individually, for each valid entry of the PPT: setting a lock blocking access to the entry, relocating the entry to the target PPT memory location, invalidating the entry in the PPT, and releasing the lock.

2. The method of claim 1 wherein relocating the CPT in portions further comprises:

prior to relocating all portions of the CPT:

receiving an access request for a particular entry of the CPT;

determining, in dependence upon the index value, whether the particular entry has been relocated;

if the particular entry has been relocated, accessing the entry at the target memory location; and if the particular entry has not been relocated, accessing the particular entry at the source memory location.

3. The method of claim 1 further comprising:

prior to all valid entries of the PPT being relocated to the target PPT memory location:

receiving from the computer processor a hardware interrupt representing a page table miss of a particular entry of the target PPT memory location;

setting a lock blocking access to the particular entry;

determining that the particular entry is valid in the PPT;

relocating the particular entry to the target PPT memory location;

invalidating the particular entry in the PPT; and releasing the lock blocking access to the particular entry.

4. The method of claim 1 further comprising:

forming, upon entering a virtualized partition memory ('VPM') mode, the CPT and the PPT from a hardware page table accessible by the computer processor and the operating system.

5. A method of relocating data amongst memory modules in a virtualized environment maintained by a hypervisor, the hypervisor administering access to memory by a partition with a Cache Page Table ('CPT') and a Physical Page Table ('PPT'), the CPT comprising virtual to physical address mappings, the CPT accessible by an operating system executing in a partition of the virtualized environment, the PPT comprising virtual to physical address mappings, the PPT accessible by a computer processor, the method comprising:

converting the virtual to physical address mappings of the CPT to virtual to logical address mappings;

establishing a Logical Memory Block ('LMB') relocation tracker, the LMB relocation tracker comprising logical addresses of an LMB to be relocated, source physical addresses of the LMB to be relocated, target physical addresses of the LMB to be relocated, a translation block indicator for each relocation granule of the LMB, and a pin count associated with each relocation granule, the pin count representing a number of outstanding translations to the associated relocation granule;

establishing a PPT entry tracker including PPT entries corresponding to the LMB to be relocated;

relocating the LMB in a number of relocation granules in dependence upon the PPT entry tracker and the LMB relocation tracker including blocking translations to the relocation granules during relocation; and upon relocation of all granules in the LMB, removing, from the LMB relocation tracker, the logical addresses of the LMB to be relocated.

6. The method of claim 5 wherein converting the virtual to physical address mappings of the CPT to virtual to logical address mappings further comprises:

initializing a CPT index value representing a first CPT entry including a virtual to physical address mapping;

for each valid CPT entry:

setting a lock blocking access to the CPT entry;

converting the CPT entry's virtual to physical address mapping to a virtual to logical address mapping;

incrementing the CPT index value; and releasing the lock blocking access to the CPT entry; and during the conversion of CPT entries:

receiving a request to add a particular CPT entry;

setting a lock blocking access to the particular CPT entry;

determining in dependence upon the CPT index value whether the particular CPT entry has been converted to include a virtual to logical address mapping;

if the particular CPT entry has been converted, adding the particular CPT entry with a virtual to logical address mapping;

if the particular CPT entry has not been converted, adding the particular CPT entry with a virtual to physical address mapping; and releasing the lock.

7. The method of claim 5 wherein relocating the LMB in a number of relocation granules further comprises:

for each relocation granule of the LMB:

blocking translations to the relocation granule;

waiting for the pin count associated with the relocation granule to represent no outstanding translations to the relocation granule;

invalidating PPT entries for the relocation granule using the PPT entry tracker; and relocating the relocation granule to a target physical address specified in the LMB relocation tracker.

8. The method of claim 5 relocating the LMB in a number of relocation granules further comprises:

receiving a translation request to a particular relocation granule that is presently relocating;

setting a virtual processor of the partition to sleep until relocation of the particular relocation granule is complete; and upon relocation of the particular relocation granule in the LMB, releasing the virtual processor from sleep.

9. The method of claim 5 wherein establishing a PPT entry tracker includes:

initializing a PPT entry index value representing a first untracked PPT entry;

for each PPT entry corresponding to the LMB to relocated, beginning with the first untracked PPT entry:

setting a lock blocking access to the PPT entry;

tracking the PPT entry in the PPT entry tracker;

incrementing the PPT entry index value; and releasing the lock blocking access to the PPT entry; and during the tracking of all PPT entries corresponding to the LMB to be relocated to the PPT entry tracker:

receiving a request to add a PPT entry;

setting a lock blocking access to the PPT entry;

determining in dependence upon the PPT entry index value whether the PPT entry has been previously tracked in the PPT entry tracker;

if the PPT entry has been previously tracked in the PPT entry tracker, replacing the previously copied virtual to physical address mapping with a virtual to physical address mapping included in the request to add the PPT entry; and if the PPT entry has not been previously tracked in the PPT entry tracker, adding the PPT entry without tracking the PPT entry in the PPT entry tracker.

10. The method of claim 5 further comprising:

after establishing the LMB relocation tracker, receiving an indication that all computer processors have returned from the hypervisor.

11. An apparatus for relocating data amongst memory modules in a virtualized environment maintained by a hypervisor, the hypervisor administering access to memory by a partition with a Cache Page Table ('CPT') and a Physical Page Table ('PPT'), the CPT comprising virtual to physical address mappings, the CPT accessible by an operating system executing in a partition of the virtualized environment, the PPT comprising virtual to physical address mappings, the PPT accessible by a computer processor, the apparatus comprising the computer processor, computer memory operatively coupled to the computer processor, the computer memory having disposed within it computer program instructions that, when executed by the computer processor, cause the apparatus to carry out the steps of:

converting the virtual to physical address mappings of the CPT to virtual to logical address mappings;

establishing a Logical Memory Block ('LMB') relocation tracker, the LMB relocation tracker comprising logical addresses of an LMB to be relocated, source physical addresses of the LMB to be relocated, target physical addresses of the LMB to be relocated, a translation block indicator for each relocation granule of the LMB, and a pin count associated with each relocation granule, the pin count representing a number of outstanding translations to the associated relocation granule;

establishing a PPT entry tracker including PPT entries corresponding to the LMB to be relocated;

relocating the LMB in a number of relocation granules in dependence upon the PPT entry tracker and the LMB relocation tracker including blocking translations to the relocation granules during relocation; and upon relocation of all granules in the LMB, removing, from the LMB relocation tracker, the logical addresses of the LMB to be relocated.

12. The apparatus of claim 11 wherein converting the virtual to physical address mappings of the CPT to virtual to logical address mappings further comprises:

initializing a CPT index value representing a first CPT entry including a virtual to physical address mapping;

for each valid CPT entry:

setting a lock blocking access to the CPT entry;

converting the CPT entry's virtual to physical address mapping to a virtual to logical address mapping;

incrementing the CPT index value; and releasing the lock blocking access to the CPT entry; and during the conversion of CPT entries:

receiving a request to add a particular CPT entry;

setting a lock blocking access to the particular CPT entry;

determining in dependence upon the CPT index value whether the particular CPT entry has been converted to include a virtual to logical address mapping;

if the particular CPT entry has been converted, adding the particular CPT entry with a virtual to logical address mapping;

if the particular CPT entry has not been converted, adding the particular CPT entry with a virtual to physical address mapping; and releasing the lock.

13. The apparatus of claim 11 wherein relocating the LMB in a number of relocation granules further comprises:

for each relocation granule of the LMB:

blocking translations to the relocation granule;

waiting for the pin count associated with the relocation granule to represent no outstanding translations to the relocation granule;

invalidating PPT entries for the relocation granule using the PPT entry tracker; and relocating the relocation granule to a target physical address specified in the LMB relocation tracker.

14. The apparatus of claim 11 relocating the LMB in a number of relocation granules further comprises:

receiving a translation request to a particular relocation granule that is presently relocating;

setting a virtual processor of the partition to sleep until relocation of the particular relocation granule is complete; and upon relocation of the particular relocation granule in the LMB, releasing the virtual processor from sleep.

15. The apparatus of claim 11 wherein establishing a PPT entry tracker includes:

initializing a PPT entry index value representing a first untracked PPT entry;

for each PPT entry corresponding to the LMB to relocated, beginning with the first untracked PPT entry:

setting a lock blocking access to the PPT entry;

tracking the PPT entry in the PPT entry tracker;

incrementing the PPT entry index value; and releasing the lock blocking access to the PPT entry; and during the tracking of all PPT entries corresponding to the LMB to be relocated to the PPT entry tracker:

receiving a request to add a PPT entry;

setting a lock blocking access to the PPT entry;

determining in dependence upon the PPT entry index value whether the PPT entry has been previously tracked in the PPT entry tracker;

if the PPT entry has been previously tracked in the PPT entry tracker, replacing the previously copied virtual to physical address mapping with a virtual to physical address mapping included in the request to add the PPT entry; and if the PPT entry has not been previously tracked in the PPT entry tracker, adding the PPT entry without tracking the PPT entry in the PPT entry tracker.

16. The apparatus of claim 11 further comprising computer program instructions capable of:

after establishing the LMB relocation tracker, receiving an indication that all computer processors have returned from the hypervisor.

17. A computer program product for relocating data amongst memory modules in a virtualized environment maintained by a hypervisor, the hypervisor administering access to memory by a partition with a Cache Page Table ('CPT') and a Physical Page Table ('PPT'), the CPT comprising virtual to physical address mappings, the CPT accessible by an operating system executing in a partition of the virtualized environment, the PPT comprising virtual to physical address mappings, the PPT accessible by a computer processor, the computer program product disposed in a computer readable storage medium, wherein the computer readable storage medium is not a signal, the computer program product comprising computer program instructions that, when executed by a computer, cause the computer to carry out the steps of:

converting the virtual to physical address mappings of the CPT to virtual to logical address mappings;

establishing a Logical Memory Block ('LMB') relocation tracker, the LMB relocation tracker comprising logical addresses of an LMB to be relocated, source physical addresses of the LMB to be relocated, target physical addresses of the LMB to be relocated, a translation block indicator for each relocation granule of the LMB, and a pin count associated with each relocation granule, the pin count representing a number of outstanding translations to the associated relocation granule;

establishing a PPT entry tracker including PPT entries corresponding to the LMB to be relocated;

relocating the LMB in a number of relocation granules in dependence upon the PPT entry tracker and the LMB relocation tracker including blocking translations to the relocation granules during relocation; and upon relocation of all granules in the LMB, removing, from the LMB relocation tracker, the logical addresses of the LMB to be relocated.

18. The computer program product of claim 17 wherein converting the virtual to physical address mappings of the CPT to virtual to logical address mappings further comprises:

initializing a CPT index value representing a first CPT entry including a virtual to physical address mapping;

for each valid CPT entry:

setting a lock blocking access to the CPT entry;

converting the CPT entry's virtual to physical address mapping to a virtual to logical address mapping;

incrementing the CPT index value; and releasing the lock blocking access to the CPT entry; and during the conversion of CPT entries:

receiving a request to add a particular CPT entry;

setting a lock blocking access to the particular CPT entry;

determining in dependence upon the CPT index value whether the particular CPT entry has been converted to include a virtual to logical address mapping;

if the particular CPT entry has been converted, adding the particular CPT entry with a virtual to logical address mapping;

if the particular CPT entry has not been converted, adding the particular CPT entry with a virtual to physical address mapping; and releasing the lock.

19. The computer program product of claim 17 wherein relocating the LMB in a number of relocation granules further comprises:

for each relocation granule of the LMB:

blocking translations to the relocation granule;

waiting for the pin count associated with the relocation granule to represent no outstanding translations to the relocation granule;

invalidating PPT entries for the relocation granule using the PPT entry tracker; and relocating the relocation granule to a target physical address specified in the LMB relocation tracker.

20. The computer program product of claim 17 relocating the LMB in a number of relocation granules further comprises:

receiving a translation request to a particular relocation granule that is presently relocating;

setting a virtual processor of the partition to sleep until relocation of the particular relocation granule is complete; and upon relocation of the particular relocation granule in the LMB, releasing the virtual processor from sleep.

21. The computer program product of claim 17 wherein establishing a PPT entry tracker includes:

initializing a PPT entry index value representing a first untracked PPT entry;

for each PPT entry corresponding to the LMB to relocated, beginning with the first untracked PPT entry:

setting a lock blocking access to the PPT entry;

tracking the PPT entry in the PPT entry tracker;

incrementing the PPT entry index value; and releasing the lock blocking access to the PPT entry; and during the tracking of all PPT entries corresponding to the LMB to be relocated to the PPT entry tracker:

receiving a request to add a PPT entry;

setting a lock blocking access to the PPT entry;

determining in dependence upon the PPT entry index value whether the PPT entry has been previously tracked in the PPT entry tracker;

if the PPT entry has been previously tracked in the PPT entry tracker, replacing the previously copied virtual to physical address mapping with a virtual to physical address mapping included in the request to add the PPT entry; and if the PPT entry has not been previously tracked in the PPT entry tracker, adding the PPT entry without tracking the PPT entry in the PPT entry tracker.

22. The computer program product of claim 17 further comprising computer program instructions capable of:

after establishing the LMB relocation tracker, receiving an indication that all computer processors have returned from the hypervisor.

23. The computer program product of claim 17 wherein the computer readable storage medium comprises a recordable medium.

24. The computer program product of claim 17 wherein the computer readable storage medium comprises a transmission medium.

* * * * *